United States Patent [19]

DiSanti et al.

[11] 4,011,407
[45] Mar. 8, 1977

[54] NARROW-BAND EIGHT-PHASE MODEM

[75] Inventors: Nicholas DiSanti, Staten Island; Frank Oster, Brooklyn, both of N.Y.

[73] Assignee: RCA Corporation, New York, N.Y.

[22] Filed: Feb. 26, 1976

[21] Appl. No.: 661,522

[52] U.S. Cl. .................................. 178/88; 178/67; 325/320

[51] Int. Cl.² ........................................ H04L 27/22

[58] Field of Search ..................... 178/66 R, 67, 88; 325/30, 320, 420, 421; 328/133, 134; 329/122, 124

[56] References Cited

UNITED STATES PATENTS

| | | | |
|---|---|---|---|
| 3,737,578 | 6/1973 | Mutsuo | 325/320 |
| 3,753,114 | 8/1973 | Burley | 178/67 |

*Primary Examiner*—Benedict V. Safourek
*Attorney, Agent, or Firm*—Carl V. Olson; Edward J. Norton

[57] ABSTRACT

An eight-phase modem is described in which a 2900 $H_z$ carrier has eight phases each representing one of eight tri-bit symbols 000 through 111. The phase modulated carrier is restricted for transmission to a frequency band of 2900 ± 50 $H_z$, and the modem can carry four time-division-multiplex 75-baud teletype channels at 250 bits per second at the upper end of a telephone voice channel without interfering with normal voice use of the channel. Or, the modem can carry eight channels at 500 bits per second in a frequency band of 2900 ± 100 $H_z$. The modem operates reliably despite a carrier frequency translation or shift of up to ± 5 $H_z$ in the communications path. The modem extracts a carrier cycle spike from the received signal during each symbol period, and uses the spike to synchronize a locally-generated reference signal, and compares each spike with the reference signal to derive the corresponding phase-modulated tri-bit symbol information.

8 Claims, 6 Drawing Figures

NARROW-BAND EIGHT-PHASE MODEM

BACKGROUND OF THE INVENTION

It is very desirable to increase as much as possible the amount of information which can be transmitted over an existing communications channel of limited bandwidth. This can be accomplished with improved modems by which a carrier wave is modulated with information at the transmitting end, and the carrier wave is demodulated to reproduce the information at the receiving end.

SUMMARY OF THE INVENTION

An improved eight-phase modem includes a receiving portion in which the received carrier is amplitude demodulated to extract the tri-bit symbol timing wave. The timing wave is used to gate out a one cycle spike of phase-modulated carrier, unaffected by intersymbol distortion, during each symbol period. The one spike per symbol period is used to lock the frequency of a locally-generated reference wave to the received carrier wave. The one spike per symbol period is also compared with the locally-generated reference wave to derive the tri-bit information corresponding to the phase modulation of the received carrier during the symbol period.

DESCRIPTION OF THE PREFERRED EMBODIMENT

Figure 1:
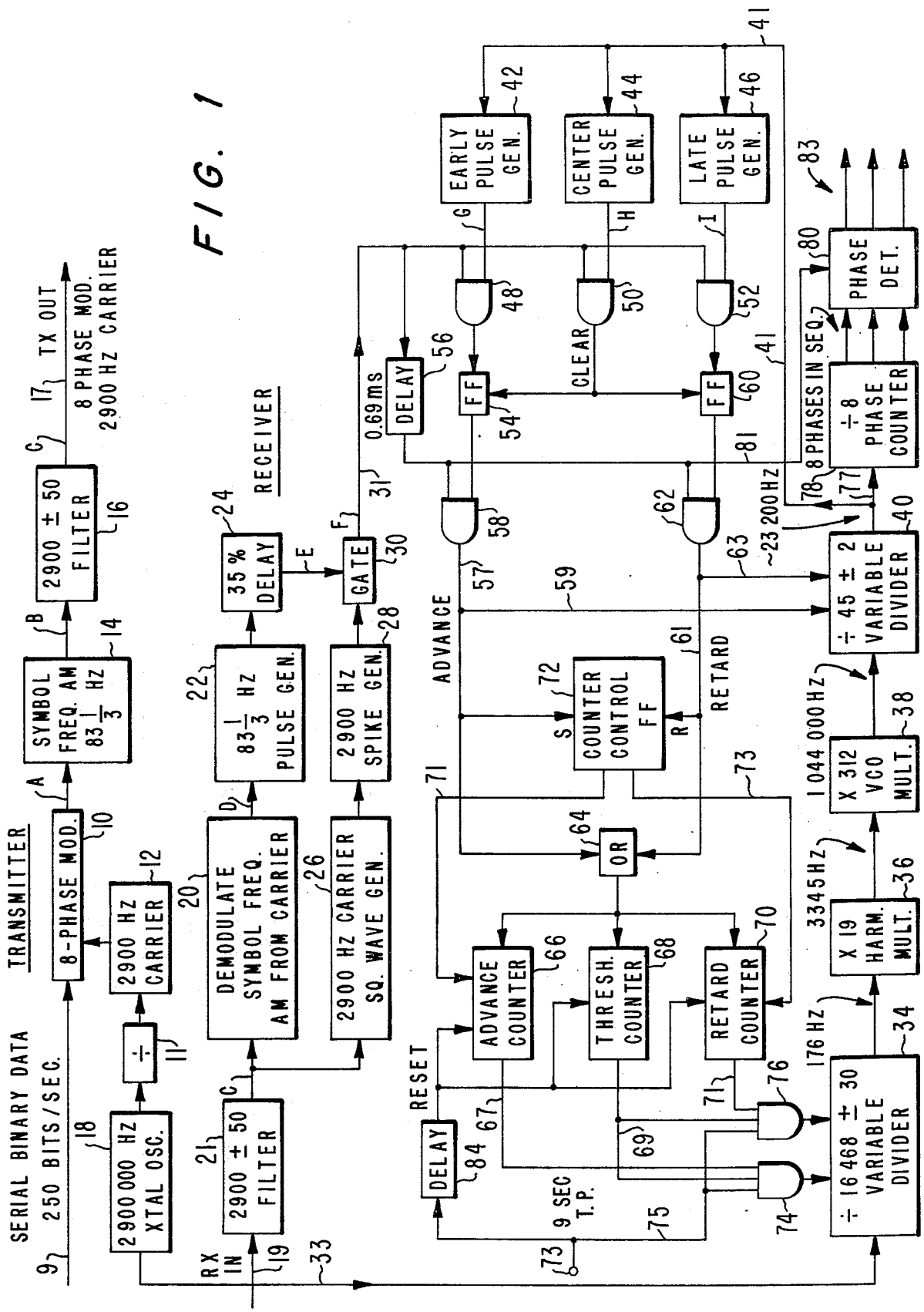
FIG. 1 is a block diagram of an eight-phase modem constructed according to the teachings of the invention.
Figure 2:
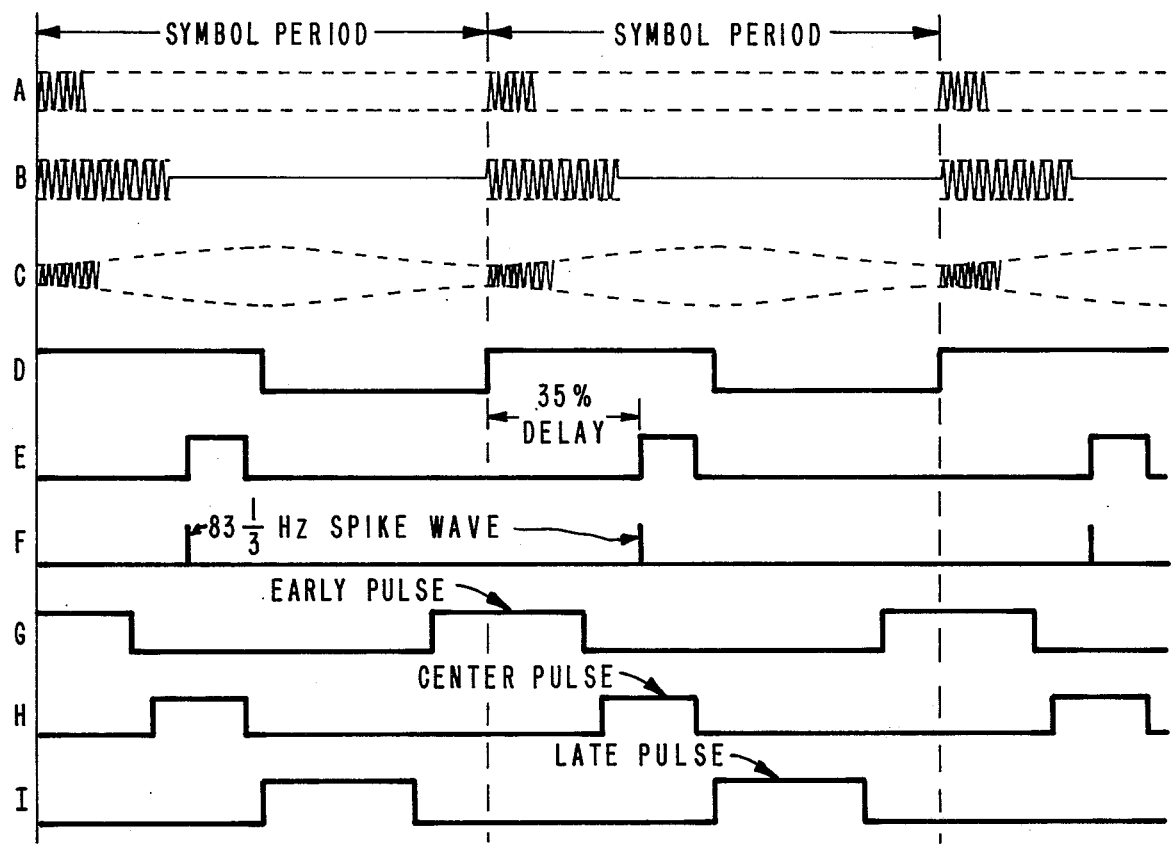
FIG. 2 is a chart of signal waveforms which will be referred to in describing the operation of the modem of FIG. 1.

The eight-phase modem shown by way of example in FIG. 1 of the drawing includes a transmitter portion having an eight-phase modulator 10 to which serial binary data or information is supplied over line 9 at a rate of 250 bits per second. Each tri-bit group of bits supplied to the modulator 10 causes the phase of the 2900 $H_z$ carrier from source 12 to be shifted to a corresponding one of eight phases. (The tri-bit groups supplied to the modulator are differentially-encoded versions of the original data so that each transmitted group represents the difference between the current data group and the preceding data group). In the present example, each tri-bit supplied to the modulator 10 results in the generation of a corresponding symbol period of 12 ms, which includes about 35 cycles of the 2900 $H_z$ carrier. The symbols have a repetition frequency of 83 ⅓ $H_z$, and a symbol period as shown in FIG. 2A. The beginning ⅓ of each phase-modulated carrier symbol is gated by gate 14, to provide amplitude modulation at the symbol frequency as shown in FIG. 2B, and passed through a 2900 ± 50 $H_z$ filter 16 to an output line 17 leading to communication apparatus (not shown). The filter 16 is a linear-phase passive bandpass filter having an output response characterized as raised cosine for the purpose of minimizing intersymbol interference. The amplitude modulated 2900 $H_z$ signal passed by filter 16 is as shown by FIG. 2C.

A 2,900025 ± 25 $H_z$ crystal oscillator 18 is employed by both the transmitting and receiving portions of the modem. The 2,900,000 $H_z$ signal is divided by 125 and by 8 in divider 11 to produce the 2900 $H_z$ carrier at 12. The 2,900,000 $H_z$ signal is divided by 29, and 400, and 3 to produce an 83 ⅓ $H_z$ signal used to determine the symbol period.

Figure 3:
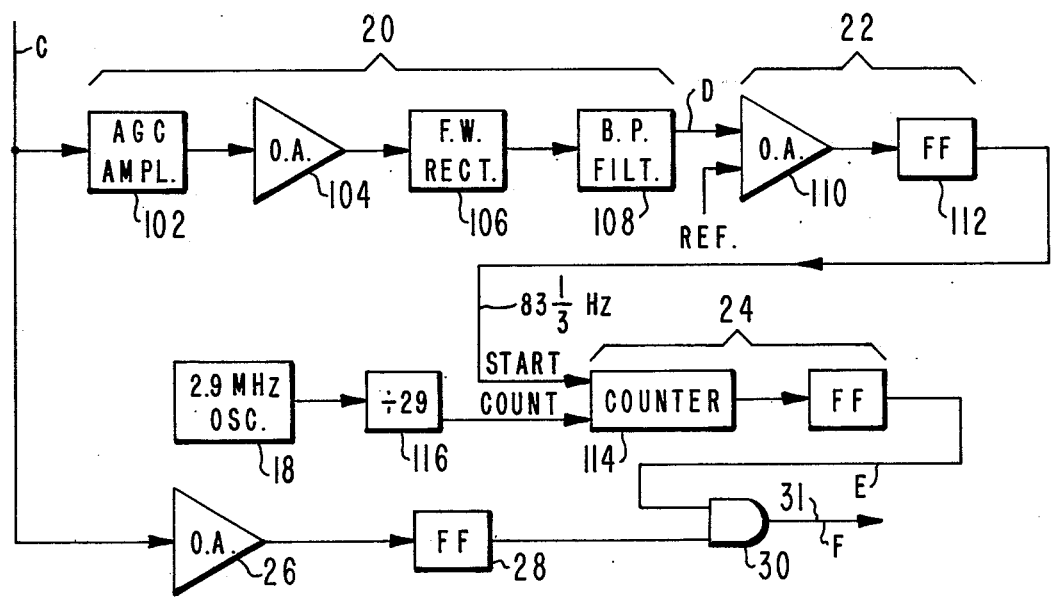
FIG. 3 is a diagram showing portions of FIG. 1 in greater detail.

A phase-modulated carrier wave from a distant transmitter is applied over line 19 to a 2900 ± 50 $H_z$ filter 21, like filter 16, and then on to an amplitude modulation detector 20 which extracts a 83 ⅓ $H_z$ wave from the carrier as shown by FIG. 2D. The extracted 83 ⅓ $H_z$ wave is shaped and translated to a 83 ⅓ $H_z$ pulse wave by pulse generator 22, and the pulse wave is delayed about 4.2 ms, which is about 35% of the symbol period of 12 ms, after a carrier envelope closure in delay unit 24 having an output as shown by FIG. 2E. The amplitude detector 20 may, as shown in FIG. 3, consist of a high gain AGC amplifier 102, an operational amplifier 104, a full wave rectifier 106 and a two-stage active bandpass filter 108 tuned to 83 ⅓ $H_z$. The pulse generator 22 may include an operational amplifier 110 for squaring up the 83 ⅓ $H_z$ sine wave received from the detector 20, and a one-shot flip-flop 112 responsive to the leading edge of the square wave to produce an 83 ⅓ $H_z$ pulse wave. The 35% delay unit 24 may be a digitally-controlled time delay unit including a counter 114 operated by a reference frequency derived through a divider 116 from the 2,900,000 $H_z$ oscillator 18.

The phase-modulated carrier from filter 21 is also applied to an over-driven operational amplifier 26 which removes all amplitude modulation and translates the 2900 $H_z$ carrier sine wave to a 2900 $H_z$ square wave. The 2900 $H_z$ square wave is translated in a spike generator 28 to a 2900 $H_z$ pulse spike wave where each pulse spike may have a width of about 344 nanoseconds determined by a one shot flip-flop (or by the period of the crystal oscillator 18, through a path not shown).

The delayed 83 ⅓ $H_z$ symbol period pulse wave from delay unit 24 is applied to a gate 30 to gate out one symbol spike per symbol period from the 2900 $H_z$ spike wave supplied by spike generator 28. Each symbol spike gated out at 31 is, as shown in FIG. 2F, one occurring about 35% of the symbol period (4.2 ms) following the beginning of a symbol frequency pulse shown in FIG. 2D, and as such it has been found to have a clear symbol phase relatively unaffected by the phases of adjacent symbols. The single symbol spike at 31 has a phase accurately representing the intended phase of the received carrier during the symbol period. The phase of each symbol spike is one of eight phases representing one of the eight symbols or binary tri-bit groups 000 through 111. The symbol spike wave has a pulse width of 0.344 microseconds, a frequency of 83 ⅓ $H_z$, and a period of 12 ms.

The receiver includes a frequency multiplying and dividing chain to locally generate a reference wave having a frequency which is eight times the frequency of the 2900 $H_z$ carrier wave, and which is locked in frequency synchronism with the received 2900 $H_z$ carrier wave. The 2,900,000 $H_z$ signal wave from the crystal oscillator 18 is applied over lead 33 to a variable divider 34 which divides the 2,900,000 $H_z$ wave by 16,468 ± 30 to produce an output wave at a frequency of about 176 $H_z$. The divider 34 includes means to increment and decrement the divisor number in response to input control signals applied thereto. The divider 34 includes a counter which counts cycles of the 2,900,000 $H_z$ wave applied to it, and produces an output pulse ever time the count reaches 16,468, and then resets the counter. When a frequency advancing control signal is applied to the divider 34, the counter outputs after counts to the incremented value of 16,468 are used, so that the output frequency is increased an amount corresponding with about 0.3 $H_z$ of the finally-resulting 2900 $H_z$ reference signal. Succeeding control signals can cause a further increase in output frequency, or a decrease in output frequency.

Figure 4:
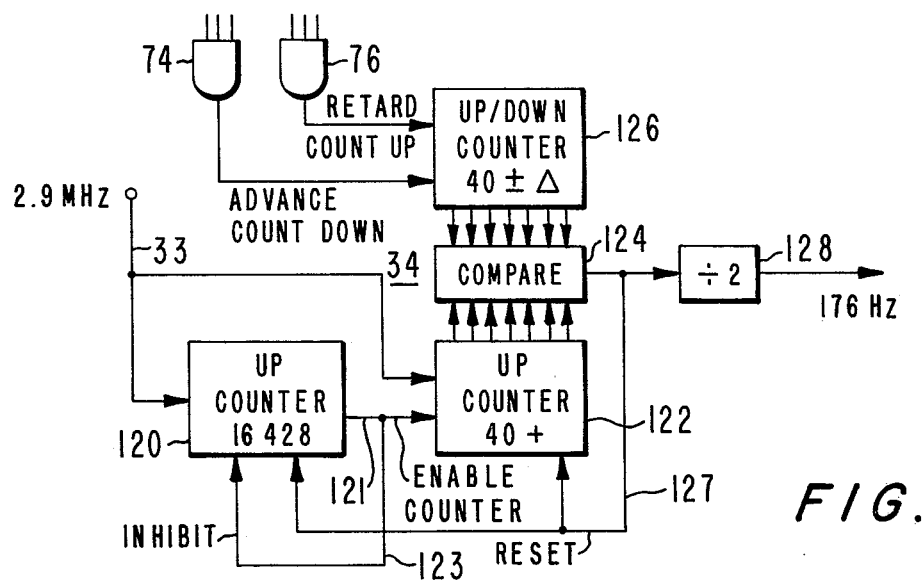
FIG. 4 is a diagram showing a variable divider in FIG. 1 in greater detail.

The divider 34 may be constructed, as shown in greater detail in FIG. 4, to include an up counter 120 which counts cycles of the 2900 $H_z$ input until a count of 16,428 is reached, at which time it enables an up counter 122 over lead 121 to count, and disables counter 120 over lead 123. The counter 122 counts until its output applied to a comparator 124 equals the stored count in an up/down counter 126. If the count stored in counter 126 is 40, the comparator provides one output pulse used over line 127 to reset the counters every time the counts in up counters 120 and 122 add up to 16,468. This represents an output frequency of about 353 $H_z$ which is 176 $H_z$ after passing through a divider 128. The count stored in up/down counter 126 can be increased by one by each pulse from gate 76, and can be decreased by one by each pulse from gate 74.

Figure 5:
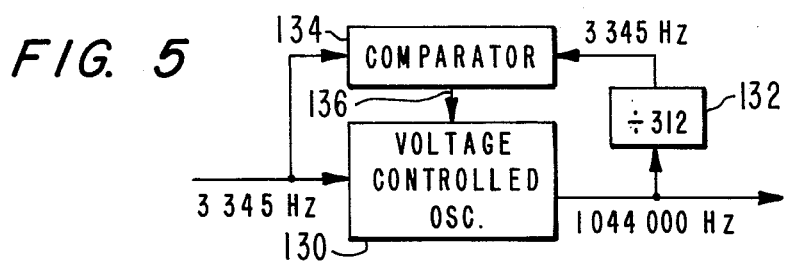
FIG. 5 is a diagram showing a frequency multiplier in FIG. 1 in greater detail.

The 176 $H_z$ output of divider 34 is multiplied exactly 19 times to about 3345 $H_z$ in a harmonic multiplier 36 in FIG. 1. The multiplier utilizes an active bandpass filter to extract the 19th harmonic from the square wave generated by the divider 34. The multiplier includes a comparator circuit for squaring the 19th harmonic. The output of multiplier 36 is multiplied by 312 in a multiplier 38, shown in greater detail in FIG. 5, which includes a 1,044,000 $H_z$ voltage-controlled oscillator 130, a divide-by 312 divider 132 for dividing the 1,044,000 $H_z$ from the oscillator down to 3,345 $H_z$, and a frequency comparator 134 for comparing the 3,345 $H_z$ from multiplier 36 and the 3,345 $H_z$ from the divider to produce a control voltage at 136 which controls the frequency of the voltage-controlled oscillator.

The 1,044,000 $H_z$ signal from multiplier 38 is applied to a variable divider 40 in FIG. 1 which normally divides by 45 to produce an output at 23,200 $H_z$, which is eight times the carrier frequency of 2900 $H_z$. The variable divider 40 includes a counter with outputs for counts of 43, 45, and 47. Normally the counter counts the cycles of the 1,044,000 $H_z$ signal and produces one output, and is reset, every time a count 45 is reached. However, an "advance" control signal applied at 59 to the variable divider causes the counter to make one count from 1 to 43 before being reset to zero. This causes a phase advance in the 23,200 $H_z$ output of the divider. Also, a "retard" control signal applied at 63 to the variable divider causes the counter to make one count from 1 to 47 before being reset, to phase retard the 23,200 $H_z$ output of the divider.

Figure 6:
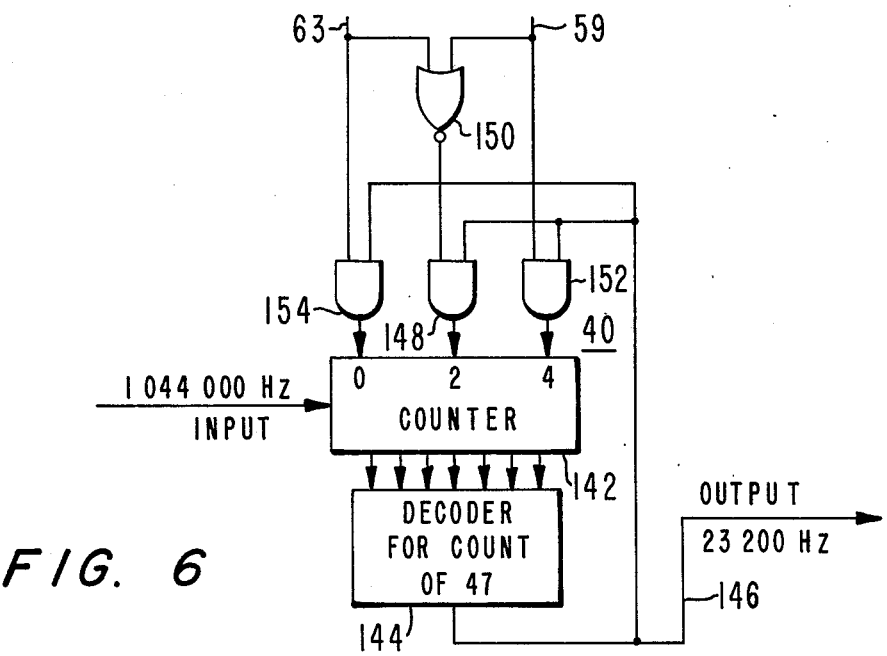
FIG. 6 is a diagram showing another variable divider in FIG. 1 in greater detail.

The divider may be constructed as shown in greater detail in FIG. 6 to include a counter 142 having its output applied to a decoder 144. The decoder provides an output at 146 whenever a count of 47 is reached. The output 146 is normally used through and gate 148 to reset the counter to a count of 2. The gate 148 is enabled through nor gate 150 when there are no signals on lines 59 and 63. Under these conditions the counter 142 counts from 2 to 47 and acts like a counter counting from 0 to 45. If there is a phase advance signal on line 59, gate 152 causes one resetting of the counter to a count of 4, so the counter acts once like a 0 to 43 counter. If there is a phase retard signal on line 63, the counter is reset to 0 through a gate 154 so that the counter acts once like a 0 to 47 counter.

The 23,200 $H_z$ signal from divider 40 in FIG. 1 is applied over line 41 to control an early pulse generator 42, a center pulse generator 44 and a late pulse generator 46, all of which produce pulse waves having a frequency of 23,200 $H_z$ and a period of about 0.043 ms. The early pulse shown in FIG. 2G occupies the first 0.016 ms of the period, the center pulse shown in FIG. 2H occupies the middle 0.011 ms of the period, and the late pulse shown in FIG. 2I occupies the last 0.016 ms of the period. The 23,200 $H_z$ early, center and late pulse waves are compared with the 83 ⅓ $H_z$ symbol spike wave (FIG. 2F) on line 31 in and gates 48, 50 and 52, respectively, for the purpose of controlling the phase of the nominally 23,200 $H_z$ reference wave from divider 40. Each symbol spike has a duration of about 0.000344 ms, and it occurs about 278 times less frequently than each of the early, center and late pulses.

If a symbol spike occurs while gate 48 is enabled by an early pulse from generator 42, the symbol spike is passed by the gate 48 to the set input of a flip-flop 54. After a delay of about 0.69 ms provided by delay unit 56, the symbol spike passes through an and gate 58 which is enabled by the set output of flip-flop 54. The resulting advance spike on line 57 is applied over line 59 to the variable divider 40 causing the counter therein to count once from 1 to 43 before being reset to zero, and then continuing to count to 45. This results in a 2 microseconds advance in the phase of the nominally 23,200 $H_z$ signal from the divider 40.

If a symbol spike occurs while gate 52 is enabled by a late pulse from generator 46, the symbol spike is passed by the gate 52 to the set input of a flip-flop 60. After a delay of 0.69 ms, the symbol spike passes through an and gate 62 which is enabled by the set output of flip-flop 60. The resulting retard spike on line 61 is applied over line 63 to the variable divider 40 to cause the counter therein to count once from 1 to 47 before being reset to zero, and then continue to count to 45. This results in a 2 microsecond retardation of the phase of the nominally 23,200 $H_z$ signal from the divider 40.

If the symbol spike occurs while gate 50 is enabled by a center pulse from generator 44, the symbol spike is passed by the gate 50 to the clear or reset inputs of flip-flops 54 and 60. Under this condition, the 23,000 $H_z$ reference signal from divider 40 is phase locked with the received 2900 $H_z$ input signal at 19, and no change is made in the divisor number 45 to which the counter counts in the divider 40.

The symbol spikes which may be passed by gates 58 and 62 and used in the described phase control loop, are also used in a simultaneously-acting frequency control loop. Spikes from both gates 58 and 62 are passed through an or gate 64 to the signal inputs of an up-/down advance counter 66, a threshold counter 68 and an up/down retard counter 70. The spike output on line 57 from gate 58 is applied to a set input S of a counter control flip-flop switch 72. The spike output on line 61 from gate 62 is applied to a reset input R of the flip-flop switch 72. When the flip-flop 72 is set, the flip-flop output on line 71 causes advance counter 66 to count up, and the flip-flop output on line 73 causes the retard counter 70 to count down. On the other hand, when the flip-flop 72 is reset, the flip-flop output on line 71 causes the advance counter 66 to count down, and the flip-flop output on line 73 causes the retard counter 70 to count up.

The result of the cross coupling to counters 66 and 70 is that the advance counter 66 contains a count of the number of advance spikes minus the number of retard spikes. Similarly, the retard counter 70 contains the number by which the retard spikes exceed and advance spikes. The advance counter 66 produces an output at 67 when the count therein exceeds a figure such as 300. The retard counter 70 produces an output at 71 when the count therein exceeds a figure such as 495. The threshold counter 68 produces an output at 69 when the sum of advance spikes and retard spikes exceeds a figure such as 900. The outputs of the three counters 66, 68 and 70 are examined once every nine seconds in and gates 74 and 76. A source of nine-second timing pulses having an output terminal 73 may consist of binary counters operated by a reference signal derived from the 2,900,000 $H_z$ crystal oscillator output.

If the and gate 74 is receiving a signal over lead 67 from advance counter 66, and a signal over lead 69 from the threshold counter 68, when the nine second timing pulse arrives over lead 75 from the output 73 of a conventional source (not shown), the gate passes a signal to the variable divider 34 which reduces the divider number and causes a slight increase in the output frequency of the nominally 177 $H_z$ signal from the divider. Similarly, if the and gate 76 is receiving a signal over lead 71 from retard counter 70, and a signal over lead 69 from the threshold counter 68, when the nine second timing pulse arrives over lead 75, the gate passes a signal to the variable divider 34 which increases the divisor number and causes a slight decrease in the output frequency of the nominally 177 $H_z$ signal from the divider. After the outputs of the counters are thus utilized, the counters are reset to zero following a slight time delay provided by delay unit 84.

If the threshold counter 68 does not reach the count of 900 during the nine second counting period, the 23,200 $H_z$ output of the frequency multiplier and divider chain is known to be locked in satisfactory frequency synchronization with the received 2900 $H_z$ carrier signal, gates 74 and 76 remain disabled, and no change in the divisor number in divider 34 is necessary or permitted.

The operation of the described frequency lock loop depends in part on the operation of the previously-described phase lock loop. The frequency lock loop needs to know which direction the reference frequency should be changed to achieve frequency synchronization with the symbol spike. When the system is out of frequency synchronization, the symbol spike might be expected to have as many coincidences with the early pulses as with the late pulses, so that advance counter 66 would receive the same number of pulses as the retard counter 70. This is not the case because of the action of the phase lock loop, as follows.

When the 23,200 $H_z$ early pulse wave and the late pulse wave are out of frequency synchronization, they move together in one direction or the other relative to the symbol spikes depending on whether the 23,200 $H_z$ reference waves are too high or too low in frequency.

For the condition in which the reference pulse waves are too low in frequency, when the 0.016 ms wide early pulses overlap the 0.00034 ms wide symbol spike, the resulting phase correction is in a direction to advance the phase of the reference waves, and this increases the number of times that the early pulses overlap the symbol spike. On the other hand, when the 0.016 ms wide late pulses overlap the 0.00034 ms wide symbol spike, the resulting phase correction is in a direction to retard the phase, and this reduces the number of times that the late pulses overlap the symbol spike. As a result of the foregoing, when the frequency of the reference pulses waves is too low, there are a greater number of frequency-advancing impulses then frequency-retarding impulses forwarded to the counters 66 and 70 in the frequency synchronizing loop. An opposite result obtains for the condition in which the reference pulse waves are too high in frequency.

When phase lock and frequency lock are achieved, the 23,200 $H_z$ reference signal at the output of variable divider 40 is exactly eight times the frequency of the received 2900 $H_z$ carrier signal at 19. The received carrier actually may have a frequency in the range of 2900 ± 5 $H_z$, and the reference signal then has a corresponding frequency in the range of 23,900 ± 40 $H_z$. The 23,200 $H_z$ reference signal has been synchronized with the received 2900 $H_z$ carrier by means of one cycle spike gated from the 2900 $H_z$ carrier spike wave during each symbol period. The spikes, which occur at the 83 ⅓ $H_z$ symbol rate, have one of eight different phases during successive symbol periods in accordance with the tribit binary information phase modulated on the 2900 $H_z$ carrier at the transmitter. The reference 23,200 $H_z$ signal has a stable fixed phase independent of information phase modulation because: the phase modulated spikes used to phase lock the 23,200 $H_z$ reference wave have eight discrete phases, and the spikes are used to phase lock a reference wave which has eight times the frequency of the received carrier from which the spikes are derived. The eight phases of the 2900 $H_z$ received carrier from which the spikes are derived correspond with eight successive cycles of the 23,200 $H_z$ reference wave. Therefore, a spike having any one of eight phases can be compared with a corresponding one of eight successive cycles of the 23,200 $H_z$ reference wave to synchronize the 23,200 $H_z$ reference wave without the particular phase of the spike affecting the phase of the synchronized 23,200 $H_z$ reference wave.

The 23,200 $H_z$ reference wave from variable divider 40 is applied over line 77 to a conventional divide-by-eight phase counter 78 producing three binary bits on three respective leads to represent the eight phases in the counting sequence 000, 001, 010, 011, 100, 101, 110, and 111. These successive eight phases of the reference wave are compared in a conventional phase detector 80 with symbol spikes applied over line 81. The phase detector 80 provides outputs at 83 representing each one of the eight phases from the counter 78 which coincides in time with a symbol spike. Each coded numer 0 through 7 which appears at 83 is subsequently translated by means not shown to a serial stream of three bits on one line for application to a time division demultiplexor and utilization by a message printing machine such as a teletypewriter.

The modem described by way of example has filters 16 and 21 passing a frequency band of 2900 ± 50 $H_z$, and has a carrier amplitude modulated at a symbol repetition rate of 83 ⅓ $H_z$, and is capable of transmitting four 75 baud teletype channels corresponding with 250 bits per second. Alternatively, the modem may be constructed with filters 16 and 21 which pass a frequency band of 2900 ± 100 $H_z$, and with a symbol repetition rate of 166 ⅔ $H_z$, and then it will be capable of transmitting eight 75-baud teletype channels corresponding with 500 bits per second. At this speed, the corresponding symbol period is 6 ms and includes 18 cycles of the carrier. The output of the pulse generator 22 is delayed by 2.1 ms, or about 35% of the symbol period. Each symbol spike occurs about 139 times less frequently than each of the early, center and late pulses.

The advantages of the invention may, of course, be obtained with other appropriate values of carrier frequency, frequency bandwidth, symbol rate, etc.

What is claimed is:

1. A receiver for a transmitted eight-phase carrier in which each phase represents a tri-bit symbol, and the carrier is amplitude modulated at the symbol frequency, comprising
    amplitude demodulator means to derive a symbol frequency pulse wave from said received carrier,
    means timed by said symbol frequency pulse wave to generate symbol spikes each having the phase of one cycle of the received carrier during a respective symbol period,
    local means to generate reference waves,
    phase lock means to compare each symbol spike with said reference waves and correct the phase of said reference waves if they are out of phase with the received carrier,
    frequency synchronizing means responsive to correction signals in said phase lock means to correct the frequency of the reference waves if they are out of synchronism with the received carrier, and
    information demodulating means to compare each symbol spike with said reference waves to determine the corresponding symbol phase and the corresponding three information bits.

2. A receiver as defined in claim 1 wherein said reference waves have a frequency equal to eight times the frequency of the received carrier to represent the timing of the eight phases of the received carrier.

3. A receiver as defined in claim 2 wherein said reference waves include a demodulation reference wave, an early pulse reference wave and a late pulse reference wave.

4. A receiver as defined in claim 3 wherein said phase lock means includes means to compare each symbol spike with said early and late pulse reference waves, and for each coincidence cause an advancing or retarding of the phase of the reference waves.

5. A receiver as defined in claim 4 wherein said frequency synchronizing means includes means to count and compare the number of coincidences of said symbol spikes with said early and late pulse reference waves, and in case of imbalance to increase of decrease the frequency of said reference waves.

6. A receiver as defined in claim 5 wherein each symbol spike is derived from a cycle of the carrier occurring about thirty-five percent of the symbol period time following a carrier envelope closure.

7. A receiver for a transmitted eight-phase carrier wave in which each phase represents a tri-bit symbol, and the carrier wave is amplitude modulated at the symbol frequency, comprising
    means to derive a symbol frequency pulse wave from said received carrier wave,
    means timed by said symbol frequency pulse wave to generate symbol spikes each having the phase of one cycle of the received carrier wave during a respective symbol period,
    local means to generate a reference wave, an early pulse wave, and a late pulse wave, all having a frequency equal to eight times the frequency of the carrier wave.
    phase lock means to compare each symbol spike with said early and late pulse waves, and for each coincidence cause an advancing or retarding of the phase of said waves,
    frequency synchronizing means to count and compare the number of coincidences of said symbol spikes with said early and late pulses, and in cases of imbalance to increase or decrease the frequency of said waves, and
    demodulator means to compare each symbol spike with said reference wave to determine the corresponding symbol phase and the corresponding three information bits.

8. A receiver for a transmitted eight-phase carrier wave in which each phase represents a tri-bit symbol, and the carrier wave is amplitude modulated at the symbol frequency, comprising
    means to translate a received carrier wave to a narrow spike wave having the same frequency and the same symbol phases as the received carrier wave,
    means to extract a symbol frequency pulse wave from said received carrier wave,
    means employing said extracted symbol frequency pulse wave to gate out one symbol spike from said spike wave about 35 percent after the beginning of each symbol period,
    a local oscillator and a frequency multiplying and dividing chain producing an output wave having a frequency eight times the frequency of the received carrier wave to represent the timing of the eight phases of the received carrier wave,
    means synchronized from said chain to generate early pulse and late pulse waves having a frequency eight times the frequency of the received carrier wave,
    means to compare each symbol spike with said early and late pulse waves, and for each coincidence cause a retarding or advancing of the phase of the output of said chain,
    means to count and compare the number of coincidences of said symbol spikes with said early and late pulses, and in case of imbalance to periodically cause a continuing decrease or increase in the frequency of the output of the chain to lock the frequency to eight times the frequency of the received carrier,
    means coupled to the output of the chain to derive signals representing the eight phases of the carrier wave frequency, and
    means to compare each symbol spike with said signals representing the eight phases to determine the symbol phase and the corresponding three information bits.

* * * * *